UNITED STATES PATENT OFFICE.

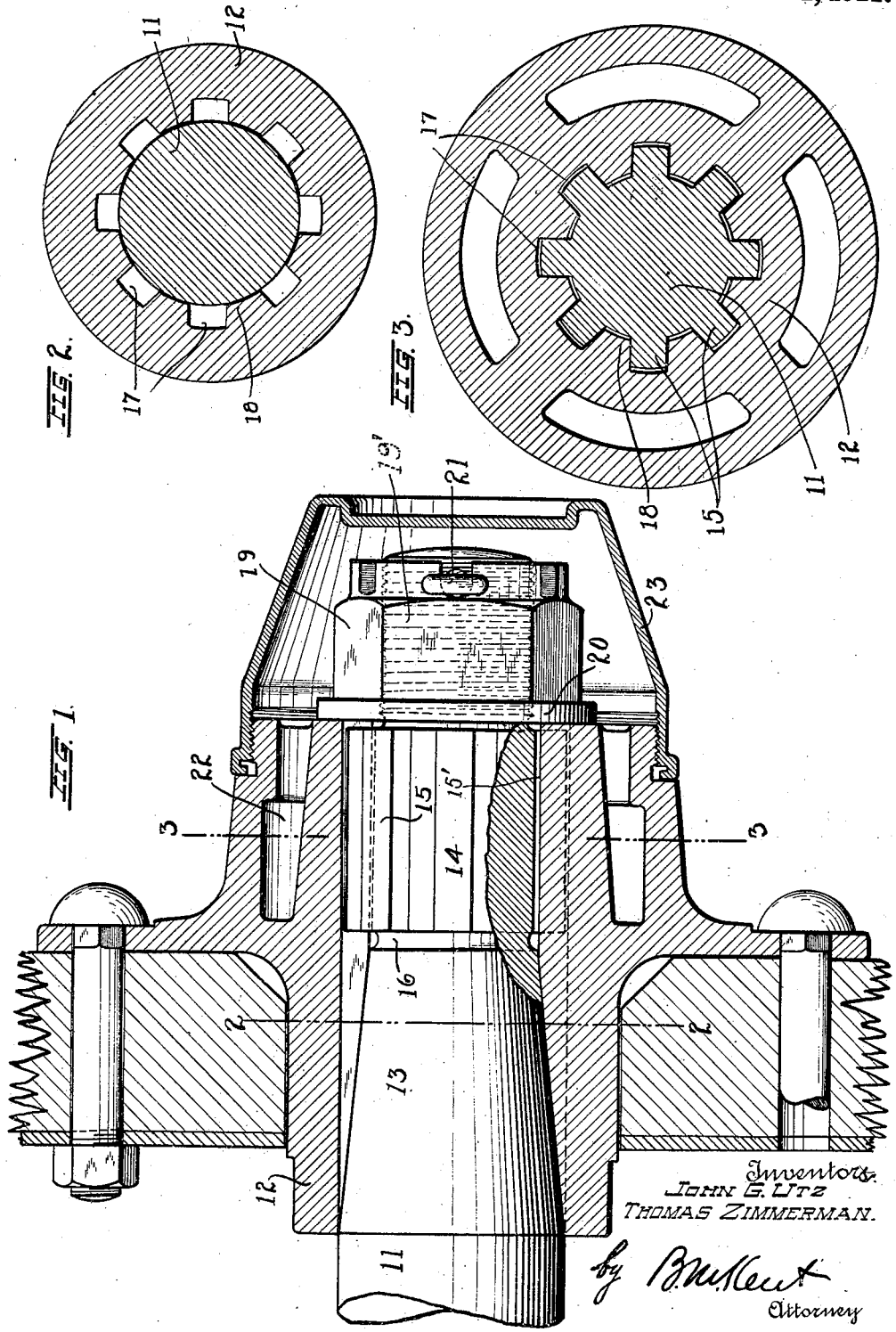

JOHN G. UTZ AND THOMAS ZIMMERMAN, OF CLEVELAND, OHIO, ASSIGNORS TO THE STANDARD PARTS COMPANY, OF CLEVELAND, OHIO, A CORPORATION OF OHIO.

AXLE.

1,370,073.

Specification of Letters Patent.

Patented Mar. 1, 1921.

Application filed December 1, 1919. Serial No. 341,783.

*To all whom it may concern:*

Be it known that we, JOHN G. UTZ and THOMAS ZIMMERMAN, citizens of the United States, and residents of Cleveland, county of Cuyahoga, State of Ohio, have invented certain new and useful Improvements in Axles, of which the following is a specification.

This invention relates to axles and more particularly to driving axles of motor vehicles. One of the objects of invention is the provision of an improved connection between the hub of a vehicle wheel and its driving shaft which may be economically and accurately manufactured and will rigidly secure the parts together but permit them to be readily disconnected when desired. Another object of the invention is to provide a construction embodying a taper fit between the parts, and driving splines wherein the torsional strength of the driving shaft as a whole will not be affected by forming the splines therein.

Other objects of the invention and the features of novelty will be apparent from the following specification, when taken in connection with the accompanying drawings in which:—

Figure 1 is a fragmentary longitudinal section through a driving axle showing a wheel mounted thereon in accordance with our invention;

Fig. 2 is a vertical section on the line 2—2 of Fig. 1; and

Fig. 3 is a vertical section on the line 3—3 of Fig. 1.

In the drawings, 11 indicates the drive shaft of an automobile axle, the hub 12 of a driving wheel being mounted on the shaft so as to be driven thereby. The drive shaft is tapered outwardly, as shown at 13, the amount of such taper being slightly exaggerated in the drawings for the sake of clearness, and the taper is stopped short of the end of the shaft to leave a portion 14 of substantially the full diameter of the shaft. This portion 14 of the shaft is grooved to form integral splines 15 of a height corresponding to the amount of taper in the tapered portion of the shaft, and thus not reduce the cross sectional area of the splined portion of the shaft below that at the small end of the taper. The splines 15 do not extend into the tapered portion of the shaft which is thus left plain or unsplined. A shallow circumferential groove 16 is preferably provided to facilitate machining and permit accurate fitting of the hub on the shaft.

The hub 12 is bored to fit the tapered part 13 of the shaft and has a cylindrical bore 15' opposite the splines 15. The hub 12 is also provided with grooves 17 to form splines 18 therebetween, such grooves being preferably formed by a broaching operation and extending straight through the hub 12 so that their bottoms will be at a uniform distance from the axis, throughout the length of the grooves. The end of the shaft 11 is threaded as shown at 19' to receive a nut 19 for securing the hub in position on the shaft, the usual washer 20 and cotter pin 21 being provided to coöperate with the parts in the usual manner. The hub 12 may be cored as shown at 22 and a hub cap 23 is threaded or otherwise secured thereon.

If it is desired, the splined portion of the shaft may be reduced slightly from normal diameter to provide a slight clearance between the outer surfaces of the splines 15 and the bottom of the groove 17 of the hub, which clearance, as well as that between the inner surfaces of the splines 18 of the hub and the bottom of the grooves between the splines 15 of the shaft, will facilitate the mounting of the hub on the shaft or its removal therefrom. By thus constructing the parts, the driving portion of the shaft will have a large cross sectional area, because the diameter at the base of its splines may be at least as great as that of the smaller end of the tapered portion of the shaft, and this is the point having the minimum torsional strength.

Having thus described our invention, what we claim is:—

1. In a device of the class described, the combination of a shaft having a splined portion and a tapered portion the smaller end of which adjoins said splined portion, the diameter of the splined portion of the shaft at the base of the splines being substantially as great as that at the smaller end of the tapered portion, and a hub fitting on the tapered portion of the shaft and having splines interengaged with the splines of the shaft.

2. In a device of the class described, the combination of a shaft having a portion thereof tapered toward the end thereof and a splined portion adjoining the smaller end of the tapered portion and having a cross sectional area at least as great as that of the smaller end of the tapered portion, a hub seated on said shaft having splines interengaging with the splines of the shaft, and means on said shaft for holding the hub in seated position.

3. In a device of the class described, the combination of a splined and tapered shaft, the splined portion thereof being of cylindrical form externally and substantially of the same diameter as the larger end of the tapered portion, and a hub fitting on the tapered portion of the shaft and being grooved throughout its length to form splines having portions adapted to engage between the splines of the shaft.

4. In a device of the class described, the combination of a shaft having a plain unsplined tapered wheel-supporting portion and a splined driving portion adjoining the smaller end of the tapered portion, and a hub having straight grooves therein the bottoms of which are parallel to the axis of the hub to form splines for interengagement with the splines on the shaft, the splines on the hub being tapered at their inner ends to conform to and fit upon the tapered portion of said shaft.

5. In a device of the class described, the combination of a shaft having a portion thereof tapered to form a conical surface and a splined portion between said tapered portion and the end of the shaft, a hub grooved throughout the length of the tapered and splined portions of said shaft to form splines having portions which fit between the splines of the shaft and portions with conical inner faces to fit upon the conical surface of the shaft, and means for securing said hub in position on said shaft.

6. In a device of the class described, the combination of a shaft having a portion thereof tapered to form a conical surface and an enlarged splined portion between said tapered portion and the end of the shaft, a hub on said shaft having a tapered bore to fit the shaft taper and a cylindrical bore opposite said shaft splines and grooves forming splines to interengage with the shaft splines, said grooves extending through the tapered bore of the hub, and means for securing said hub in position on said shaft.

In testimony whereof we affix our signatures.

JOHN G. UTZ.
THOMAS ZIMMERMAN.